(12) United States Patent
Buerkle

(10) Patent No.: US 7,416,206 B2
(45) Date of Patent: Aug. 26, 2008

(54) DRAWBAR HAMMER STRAP PIN LOCK

(75) Inventor: Bryan Kirk Buerkle, Waterloo, IA (US)

(73) Assignee: Deere & Company, Moline, IL (US)

( * ) Notice: Subject to any disclaimer, the term of this patent is extended or adjusted under 35 U.S.C. 154(b) by 274 days.

(21) Appl. No.: 11/446,634

(22) Filed: Jun. 5, 2006

(65) Prior Publication Data

US 2007/0290484 A1 Dec. 20, 2007

(51) Int. Cl.
*B60D 1/02* (2006.01)
(52) U.S. Cl. .................. 280/515; 280/504; 280/507; 280/508; 280/509; 280/511
(58) Field of Classification Search ............. 280/507, 280/515
See application file for complete search history.

(56) References Cited

U.S. PATENT DOCUMENTS

| | | | | |
|---|---|---|---|---|
| 4,579,364 A | * | 4/1986 | Kranz | 280/515 |
| 5,769,559 A | * | 6/1998 | Olson | 403/322.1 |
| 5,921,699 A | * | 7/1999 | Olson | 403/322.1 |
| 6,193,260 B1 | * | 2/2001 | Homan et al. | 280/515 |
| 6,758,486 B1 | * | 7/2004 | Kollath | 280/515 |
| 7,048,294 B2 | | 5/2006 | Heitlinger | |
| 2004/0119263 A1 | | 6/2004 | Kollath | |
| 2004/0232655 A1 | | 11/2004 | Heitlinger | |
| 2008/0067785 A1 | * | 3/2008 | Buerkle et al. | 280/515 |

FOREIGN PATENT DOCUMENTS

| CA | 1228381 | 10/1987 |
|---|---|---|
| DE | 30 16 247 | 11/1981 |
| EP | 1 479 925 | 11/2004 |

OTHER PUBLICATIONS www.powerpin.ca, PowerPin, Inc, Home Web Page.*
John Deere Parts Catalog 5420 and 5520 Tractors (9425) (Grid: 5G25; Section 70; p. 58) *Drawbar Hammer Strap,* date unknown, printed Dec. 12, 2005; 1 page.
John Deere Parts Catalog 8130, 8230, 8330, 8430 and 8530 Tractors (North American Edition) (9451) (Grid: 3123; Section: 70; p. 66) *Drawbar Clevis* (North American Version), date unknown, printed Dec. 12, 2005; 1 page.

(Continued)

*Primary Examiner*—Lynda Jasmin
*Assistant Examiner*—Patrick Centolanzi

(57) ABSTRACT

A drawbar hammer strap assembly design achieves a low profile, and prevents rotation of the drawbar and of the cross pin. The drawbar hammer strap assembly includes a drawbar, a hammer strap member attached to the drawbar, a drawbar pin mountable to drawbar and hammer strap member and a cross pin rotatably mounted in the hammer strap for releasably holding the drawbar pin in its mounted position. The hammer strap has a pair of detent recesses formed in the sides thereof. The drawbar hammer strap assembly also includes a handle member which is pivotally coupled to an upper end of the drawbar pin. The handle member is pivotal to an unlatched position wherein it is spaced apart from the detent recess, and to a latched position wherein it is releasably received in the detent recess. The handle member is engagable with a lever arm of the cross pin to hold the cross pin in its locked position when the handle member is in its latched position.

10 Claims, 1 Drawing Sheet

OTHER PUBLICATIONS

John Deere Parts Catalog 9120, 9220, 9320, 9420, 9520, and 9620 Tractors (2852) (Grid: 7H24; Section: 70; p. 116) *Heavy Duty Drawbar Support Kit,* date unknown, printed Dec. 12, 2005; 1 page.

ISO/FDIS 6489-3:2003(E); *PTO drive shaft clearance,* date unknown, p. 6, 1 page.

\* cited by examiner

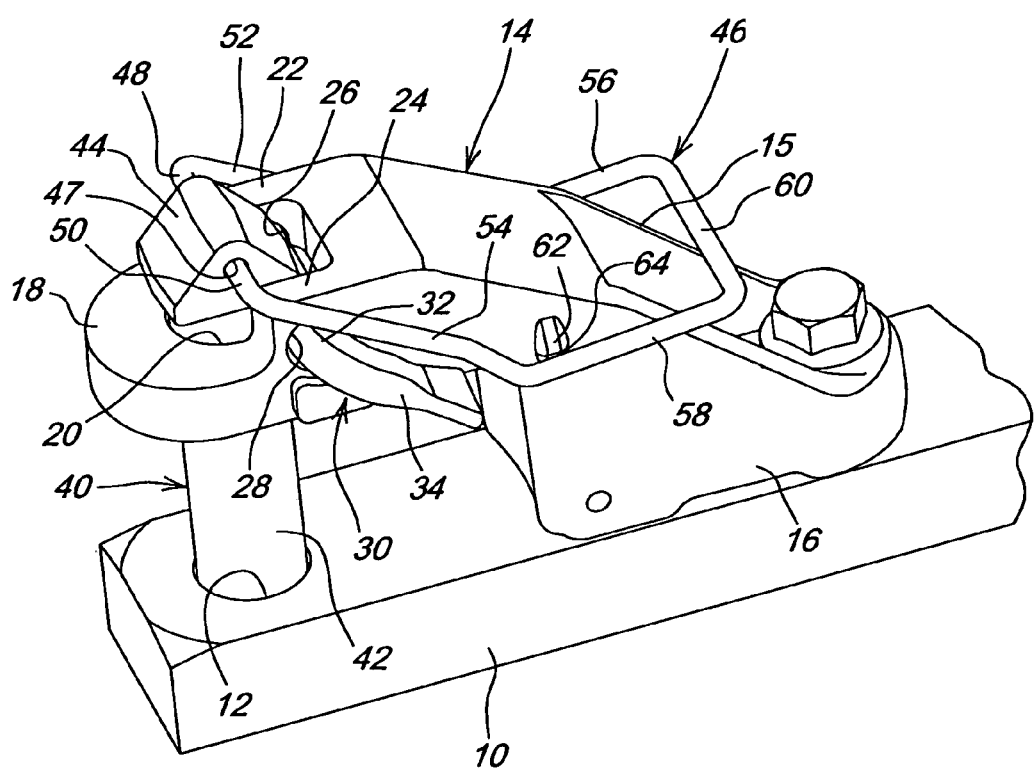

DRAWBAR HAMMER STRAP PIN LOCK

BACKGROUND

The present invention relates to a drawbar hammer strap for coupling a towed implement to a tractor drawbar.

Typically, a hammer strap is mounted on a tractor drawbar, and a towed implement can be coupled to the drawbar with a drawbar or hammer strap pin which passes through the hammer strap and the drawbar. Preferably, such a hammer strap should have a low profile in order to accommodate power-take-off (PTO) operated equipment using the drawbar while operating over uneven terrain. A hammer strap which extends too high may contact the PTO. The drawbar pin should remain vertically fixed despite vertical movement of the implement and drawbar. The drawbar pin also must resist rotational movement so as not to cause excessive wear to the drawbar and/or hammer strap. The drawbar pin must be secured in it's working position. Finally, for customer, convenience it would be desirable to provide a handle for the drawbar pin.

SUMMARY

Accordingly, an object of this invention is to provide a drawbar hammer strap assembly which has a low profile and sufficient PTO clearance.

A further object of the invention is to provide such a drawbar hammer strap assembly which can hold a drawbar cross pin in a locked position.

A further object of the invention is to provide such a drawbar hammer strap assembly which can prevent rotation of drawbar pin.

These and other objects are achieved by the present invention, wherein a drawbar hammer strap assembly includes a drawbar, a hammer strap member attached to the drawbar, a drawbar pin mountable to drawbar and a hammer strap member and a cross pin rotatably mounted in the hammer strap for releasably holding the drawbar pin in its mounted position. The hammer strap has a pair of detent recesses formed in the sides thereof. The drawbar hammer strap assembly also includes a handle member which is pivotally coupled to an upper end of the drawbar pin. The handle member is pivotal to an unlatched position wherein it is spaced apart from the detent recess, and to a latched position wherein it is releasably received in the detent recess. The handle member is engagable with a lever arm of the cross pin to hold the cross pin in its locked position when the handle member is in its latched position.

The handle member includes a pair of handle arms which are pivotally coupled to the upper end of the drawbar pin, and a pair of leg members which extend away from the handle arms on opposite sides of the hammer strap member, and a cross leg which joins and extends between the ends of the leg members.

BRIEF DESCRIPTION OF THE DRAWINGS

The sole FIGURE is a perspective view of drawbar hammer strap assembly according to the present invention.

DETAILED DESCRIPTION

Referring to the sole FIGURE, a drawbar 10 has a bore 12 extending vertically therethrough. A hammer strap 14 is attached to the drawbar 10 near its aft end. The hammer strap 14 includes a body 15 which extends upwardly and rearwardly from a base 16 to a rear upper part 18. Part 18 includes a vertically extending bore 20 which is aligned with bore 12. Upper part 18 also forms a pair of cross pin retainer members 22 and 24 through which cross pin bores 26 and 28 extend. Bores 26 and 28 receive the shaft 32 of cross pin 30. Cross pin 30 also includes a lever arm 34 which projects from an end of shaft 32. The cross pin 30 operates in a known manner to releasable hold the drawbar pin 40 mounted in the bores 12 and 20.

A drawbar pin 40 is mountable through bores 12 and 20. Drawbar pin 40 includes a shaft 42 and a head 44 attached to and upper end of shaft 42. A handle 46 is pivotally coupled to the head 44 of drawbar pin 40. Handle 46 includes a pair of head-engaging arms 48 and 50 which are received in opposite ends of a bore 47 which extends laterally through the head 44. Arms 48 and 50 extend transversely with respect to a fore-and-aft axis of the drawbar 10. Handle 46 also includes a pair of first legs 52 and 54 which (in the latched position shown) extend generally rearwardly and downwardly to a corresponding pair of second legs 56 and 58. Legs 56 and 58 extend generally rearwardly and at an angle with respect to legs 52 and 54. The rear ends of legs 56 and 58 are joined together by a cross leg 60. A pair of protrusions 62 form a pair of detent recess 64 in opposite sides of the hammer strap body 15, one of which is visible in the FIGURE. When the handle 46 is in its latched position, the second legs are releasable received in the recesses 64, and the leg 54 is positioned to engage lever arm 34 and thereby prevent rotation of the cross pin 30.

It will be apparent that, when the handle 46 is pivoted upwards and out of the recesses 64 and over protrusions 62, the legs 58 will move upwards and away from lever arm 34, and this will permit the lever arm 34 to be rotated counter-clockwise, thus rotating cross pin 30 from its locked position to its unlocked position.

With this design, when the handle member 46 is pushed down over the protrusions 62 on both sides of the hammer strap 14, the handle member 46 will prevent the cross pin 30 from rotating while receiving no vertical or rotational load from the drawbar pin 40 itself.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A drawbar hammer strap assembly comprising:
   a drawbar;
   a hammer strap member attached to the drawbar, the hammer strap having a detent recess formed in a surface thereof;
   a drawbar pin mountable to drawbar and hammer strap member;
   a cross pin rotatably mounted in the hammer strap for operable engagement with the drawbar pin to releasably hold the drawbar pin in its mounted position, the cross pin having a lever arm manipulatable to rotate the cross pin to an unlocked position permitting removal of the drawbar pin and to a locked position preventing removal of the drawbar pin; and
   a handle member pivotally coupled to the drawbar pin, the handle member being pivotal to an unlatched position wherein it is spaced apart from the detent recess, and to a latched position wherein it is releasably received in the detent recess, the handle member being engagable with the lever arm to hold the cross pin in its locked position when the handle member is in its latched position.

2. The drawbar hammer strap assembly of claim 1, wherein the handle member comprises:
a pair of handle arms which are pivotally coupled to an upper end of the drawbar pin;
a pair of leg members, each having a first end connected to a corresponding one of the handle arms and extending away therefrom to a second end; and
a cross leg which joins and extends between the second ends of the leg members.

3. The drawbar hammer strap assembly of claim 2, wherein:
the handle arms are received in recesses which are formed in opposite sides of a head formed on an upper end of the drawbar pin.

4. The drawbar hammer strap assembly of claim 2, wherein:
the handle arms extend transversely with respect to a fore-and-aft axis of the drawbar, and are received in recesses which are formed in opposite sides of a head formed on an upper end of the drawbar pin.

5. The drawbar hammer strap assembly of claim 1, wherein:
the hammer strap member includes a pair of detent recesses which are formed in opposite sides of the hammer strap member.

6. The drawbar hammer strap assembly of claim 1, wherein the handle member comprises:
a pair of handle arms which are pivotally coupled to an upper end of the drawbar pin;
a pair of first leg members, each having a first end connected to a corresponding one of the handle arms and extending away therefrom to a second end; and
a pair of second leg members, each having a first end connected to a corresponding one of the first leg members and extending away therefrom to a second end; and
a cross leg which joins and extends between the second ends of the second leg members.

7. The drawbar hammer strap assembly of claim 6, wherein:
when the handle member is in its latched position, the first leg members extend fowardly and downwardly from the handle arms, and the second leg members extend generally forwardly from the first leg members.

8. The drawbar hammer strap assembly of claim 6, wherein:
the second legs members extend at an angle with respect to the first legs members.

9. A drawbar hammer strap assembly having a drawbar, hammer strap member attached to the drawbar, a drawbar pin mountable to the drawbar and hammer strap member, and a cross pin rotatably mounted in the hammer strap for operable engagement with the drawbar pin, characterized by:
a detent recess formed in a surface of the hammer strap member; and
a handle member pivotally coupled to the drawbar pin, the handle member being pivotal to an unlatched position wherein it is spaced apart from the detent recess, and to a latched position wherein it is releasably received in the detent recess, and the handle member, when in its latched position, being engagable with the cross pin to hold the cross pin in a locked position preventing removal of the drawbar pin.

10. A drawbar hammer strap assembly comprising:
a drawbar having a first bore in an end thereof;
a hammer strap member attached to the drawbar and having a second bore spaced apart from and aligned with the first bore, the hammer strap having a detent recess formed in a surface thereof;
a drawbar pin which is insertable through the second bore and into the first bore, the drawbar pin having a shaft and a head attached to one end of the shaft;
a cross pin rotatably mounted in the hammer strap for operable engagement with the drawbar pin, the cross pin having a lever arm manipulatable to rotate the cross pin to an unlocked position permitting removal of the drawbar pin and to a locked position preventing removal of the drawbar pin; and
a handle member pivotally coupled to the drawbar pin, the handle member having a hammer strap engaging part, the handle member being pivotal to an unlatched position wherein the hammer strap engaging part is spaced apart from the hammer strap, and to a latched position wherein the hammer strap engaging part engages the hammer strap and is releasably received in the detent recess, the handle member being engagable with the lever arm to hold the cross pin in its locked position when the handle member is in its latched position.

* * * * *